United States Patent [19]

Mulcahey

[11] Patent Number: 5,055,793

[45] Date of Patent: Oct. 8, 1991

[54] PORTABLE TRANSMITTER APPARATUS FOR INDUCING ALTERNATING CURRENT IN A BURIED METALLIC LINE

[75] Inventor: Donald M. Mulcahey, San Dimas, Calif.

[73] Assignee: Thomas W. Mulcahey, Glendale, Calif.

[21] Appl. No.: 520,528

[22] Filed: May 8, 1990

[51] Int. Cl.⁵ .................. G01V 3/11; G01V 3/165
[52] U.S. Cl. ............................... 324/326; 324/329
[58] Field of Search ............ 324/67, 326–329, 324/334; 340/551

[56] References Cited

U.S. PATENT DOCUMENTS

| | | | |
|---|---|---|---|
| 3,617,865 | 11/1971 | Hakata | 324/326 |
| 3,653,050 | 3/1972 | Eggleston, Jr. | 324/326 X |
| 3,742,341 | 6/1973 | Clowes et al. | 324/329 |
| 3,852,758 | 12/1974 | Polson | 343/718 |
| 4,348,639 | 9/1982 | Karbowski | 324/329 |
| 4,458,204 | 7/1984 | Weber | 324/326 |
| 4,691,165 | 9/1987 | Szedlmajer | 324/326 |
| 4,785,247 | 11/1988 | Meador et al. | 324/338 |
| 4,818,944 | 4/1989 | Rippingale | 324/326 |

Primary Examiner—Gerard R. Strecker
Attorney, Agent, or Firm—Gene W. Arant

[57] ABSTRACT

A system of apparatus for locating underground metallic lines includes a transmitter apparatus at a first work station above ground for inducing a current in the line and a receiver at a second work station for making field measurements. The transmitter apparatus includes a battery-powered transmitter circuit supported from a portable housing, a ferrite core antenna incorporated within the transmitter circuit, and a separate tank circuit which includes a loop antenna and a capacitor and is tuned to a predetermined operating frequency and is electrically isolated from the ferrite core antenna. The ferrite core antenna transfers energy through a magnetic flux field to the loop antenna, and a magnetic field generated from the loop antenna inductively creates an alternating current in the line which then generates an alternating electromagnetic field about the line at the second work station.

16 Claims, 7 Drawing Sheets

PORTABLE TRANSMITTER APPARATUS FOR INDUCING ALTERNATING CURRENT IN A BURIED METALLIC LINE

BACKGROUND OF THE INVENTION

It has been common practice for some time to utilize electrical detection equipment to determine the exact location and depth of buried metallic lines such as underground pipes or cables, particularly when construction work is in progress and there is a known risk of damaging or destroying those critical assets. According to the conventional practice, an alternating current is induced in the line at a first point along its length, and at a second point along its length a measurement above ground is made of the electromagnetic field which then appears as a result.

As is well known, at the first work station the alternating current is induced in the line at a frequency which may typically be 100 Kilohertz, and at the second work station a search coil associated with a receiver tuned to the same frequency is moved about in order to accomplish the measurements. Depending upon the orientation of the search coil, its lateral movement will produce either a maximum or a minimum reading indicative of the lateral location of the line. Other measurement techniques are then used to determine the exact depth of the buried line at the second location.

Any electromagnetic field energy which is transmitted above ground and picked up by the receiver tends to interfere with the accuracy of the desired measurements. However, the underground transmission of energy is significantly more efficient than the transmission above ground, since it is based upon electrical current flowing in a continuous, electrically conductive medium.

For effective field work it is common practice to utilize a portable, battery-powered transmitter at the first work station. The maximum distance from the transmitter that the receiver can provide reliable measurements is, in general, proportional to the output energy from the transmitter that is successfully induced into the underground line. Thus, the efficiency with which the transmitter utilizes the battery power is very important.

Sometimes the metallic line is buried quite deeply, and since the transmitter is positioned only on the surface of the ground, a strong signal is required in order to penetrate the full depth of earth. Not only is it essential to generate a strong transmitter signal, but the magnetic flux pattern should be widely dispersed so as to reach a deeply buried line.

Thus, it has become important in this technology to achieve as strong and effective an induced signal as possible, consistent with transmitter equipment that is easily portable and is powered by batteries which are part of the transmitter equipment.

PRIOR ART

Detection equipment of this general type has been illustrated in previous patents including, for example, the Hakata U.S. Pat. No. 3,617,865; Eggleston U.S. Pat. No. 3,653,050; Karbowski U.S. Pat. No. 4,348,639; Szedlmajer U.S. Pat. No. 4,691,165; and Rippingal U.S. Pat. No. 4,818,944.

Additional prior art that is relevant to the present invention includes the following U.S. patents:
Berndt U.S. Pat. No. 2,202,368   1940
Polson U.S. Pat. No. 3,852,758   1974
Meador et al U.S. Pat. No. 4,785,247   1988

Berndt relates to an above-ground receiver. Polson relates to a movable transmitter apparatus that is used only above ground. Meador et al relates to electrical measurements made in conjunction with earth drilling equipment.

SUMMARY OF THE INVENTION

The present invention is an improvement in a system of apparatus for locating underground metallic lines of the type which includes a transmitter apparatus for use at a first work station above ground to inductively create an alternating current in the line and to thereby generate an alternating electromagnetic field about an extended length of the line. In such a system a receiver is used at a second work station above ground to make measurements within that alternating electromagnetic field which are then determinative of both the horizontal location and the depth of the line at that station. More particularly, the present invention provides an improved transmitter apparatus for such a system.

According to the invention a portable transmitter apparatus is adapted to be placed on the ground at the first work station. A battery-powered transmitter circuit has a predetermined operating frequency and has a ferrite core antenna incorporated within it. A separate tank circuit includes a loop antenna and a capacitor, is tuned to the same operating frequency as the transmitter circuit, or substantially so, and is electrically isolated from the ferrite core antenna. The ferrite core antenna is supported in such position relative to the loop antenna that its longitudinal axis extends perpendicularly through a central plane of the loop antenna. The loop antenna is so positioned relative to the ground that it generates a magnetic field with alternating flux lines which extend underneath the underground line.

Figures 1, 2, 3:
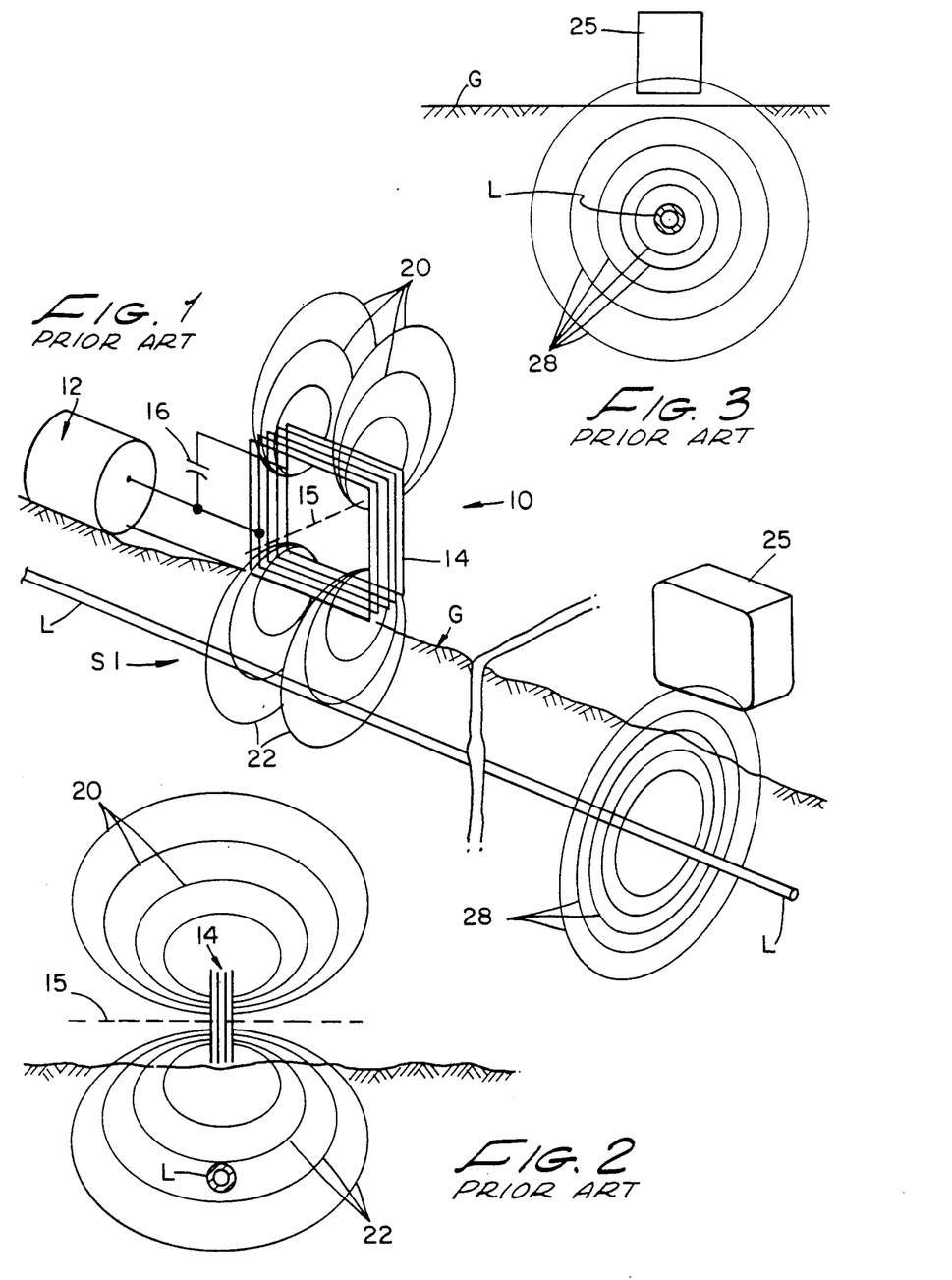
FIG. 1 is a perspective view illustrating the operation of a prior art detecting system.
FIG. 2 is a cross-sectional elevation view of the system of FIG. 1 taken near the transmitter station.
FIG. 3 is a cross-sectional elevation view of the system of FIG. 1 taken near the receiver station.

DESCRIPTION OF PRIOR ART
(FIGS. 1-3)

In the prior art system which is shown schematically in FIGS. 1 through 3, a transmitter apparatus 10 is positioned at work station S1 on the ground G, while a receiver 25 is positioned at work station S2. An underground metallic line L is pictured as being a metal pipe for conveying water, natural gas, or the like, but it may instead be an underground cable used for telephone or power transmission. Its general location is known from maps or the like, but its exact location must be determined in order to avoid damage or destruction during the course of proposed construction or repair work.

Transmitter apparatus 10 includes a battery-powered transmitter circuit 12, an air loop antenna 14 of generally rectangular configuration, and a capacitor 16 connected to the ends of the loop antenna to form a tank circuit which oscillates at a predetermined operating frequency. The output of transmitter circuit 12 is drivingly connected to the tank circuit. Depending upon the construction of the particular transmitter circuit, it may contain its own frequency-determining elements tuned to the same operating frequency; or alternatively, the tank circuit 14, 16 may provide the sole means of determining the operating frequency. The transmitter frequency is preferably within the range of about 20 to about 200 Kilohertz, and typically about 100 Kilohertz.

The loop antenna 14 has a small number of turns and is positioned so that its windings are in essentially a vertical plane. Its axis, i.e., the central line about which all of its several turns are looped upon themselves, is designated by the numeral 15 in FIG. 2 and is horizontal. The loop antenna is so positioned that its axis is also substantially perpendicular to the direction of the underground metallic line L. Driven by the transmitter circuit, the loop antenna generates an alternating magnetic field at all points on its periphery. Since this antenna is of generally rectangular shape with its ends being shorter than its top and bottom portions, only the vertical portions of magnetic field are illustrated in the drawing. Thus, the top section of the loop antenna 14 generates alternating magnetic fields 20 in a number of parallel planes which extend vertically above the loop axis 15 while the bottom section of the loop antenna 14 generates alternating magnetic fields 22 in a number of parallel planes which extend vertically below the loop axis 15. As shown most clearly in FIG. 2, the bottom fields 22 envelop the underground line L, thereby inductively creating an alternating electrical current in the line.

The alternating current flow within the line L then generates an alternating electromagnetic field at the second work station S2. For present purposes it is sufficient to illustrate the magnetic component 28 of that field. The strength of the magnetic field 28 is generally proportional to the amount of energy which the transmitter apparatus has induced in the line at the first work station S1, but is also generally inversely proportional to the distance between the two work stations. Receiver 25 is utilized in one of several known methods for taking measurements of the electromagnetic field from which both the horizontal or lateral position of the line L, and its exact depth at station S2, can then be determined.

Figure 4:
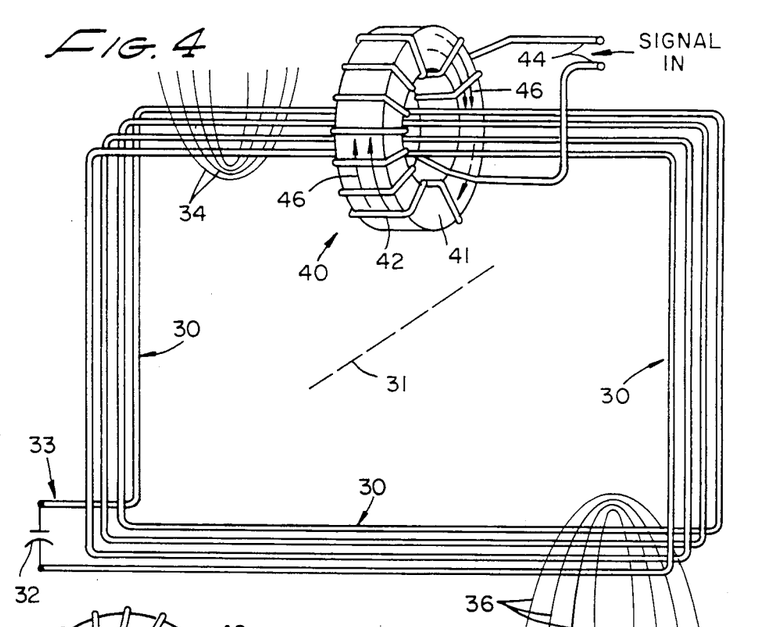
FIG. 4 is a perspective view of a loop antenna and a toroidal ferrite core antenna in accordance with a first embodiment of the present invention.
Figures 5, 6:
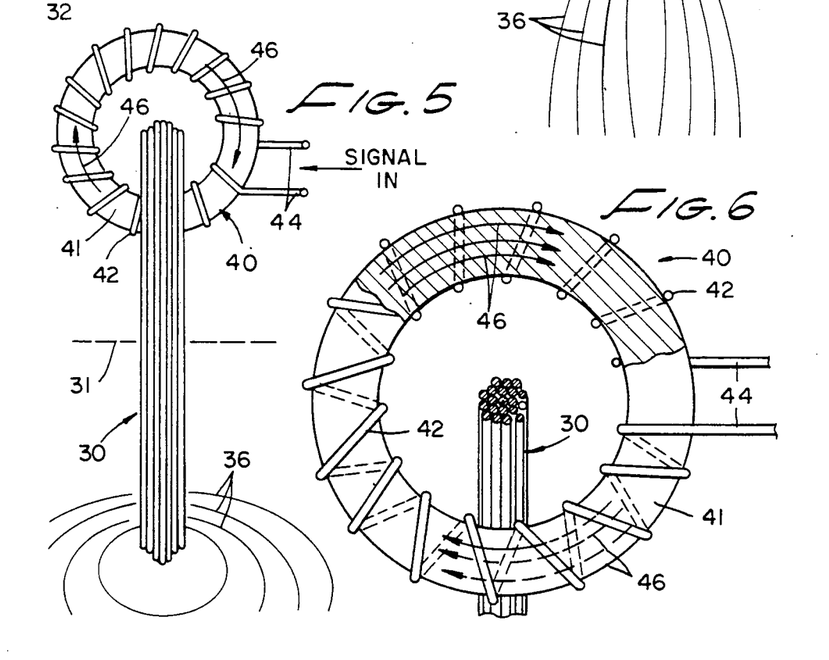
FIG. 5 is an end elevation view of the apparatus of FIG. 4.
FIG. 6 is an end elevation view, partly in cross-section, of the toroidal core of FIG. 4.

FIRST EMBODIMENT OF THE INVENTION
(FIGS. 4-6)

Reference is now to FIGS. 4 through 6 which illustrate a first embodiment of the invention. A transmitter apparatus includes a battery-powered transmitter circuit (not specifically shown) having a predetermined operating frequency. A tank circuit 33 includes a loop antenna 30 and a capacitor 32, and is tuned to that same operating frequency. Tank circuit 33 is not electrically coupled to the transmitter circuit, and is driven from a high-permeability type of core antenna by means of magnetic coupling only.

Thus a ferrite core antenna 40 which is incorporated in the transmitter circuit has a core 41 of toroidal configuration, and a winding 42 with signal input terminals 44. The toroidal antenna is electrically isolated from tank circuit 33. The toroid 41 has a circular axis 46 which is an internal flux path along which magnetic flux is driven by current flowing in the winding 42. This longitudinal, though circular, axis of the ferrite core passes within and through the loop of the loop antenna, as well as outside the loop antenna, because the toroid is a closed structure.

The loop antenna 30 and the ferrite core antenna 40 are supported in such positions relative to each other and to the ground that the axis 31 of the loop is substantially horizontal, and a magnetic field which is generated from the loop antenna alternates in planes that are substantially perpendicular to the longitudinal axis of the underground line. Upwardly extending planes of the magnetic field are indicated in FIG. 4 by numeral 34, and downwardly extending lines of force are designated as 36 in FIGS. 4 and 5.

There are several advantages of the invention as shown in FIGS. 4-6. The toroidal core antenna 33 operates as a magnetic flux amplifier which frees the loop antenna 30 from restraints of the driving electrical circuit. By designing the tank circuit 33 for a high Q it can be caused to produce maximum energy output at the predetermined operating frequency. Circuit parameters may be designed to conform to limitations of the batteries which energize the transmitter circuit, while maximizing useful output. At the same time the toroidal core antenna adds relatively little to the overall space and weight of the transmitter apparatus.

DESCRIPTION OF THE SECOND EMBODIMENT (FIGS. 7-9 and 14-18)

Reference is now made to FIGS. 7-9 and 14-18 illustrating a second embodiment of the invention.

Figure 16:
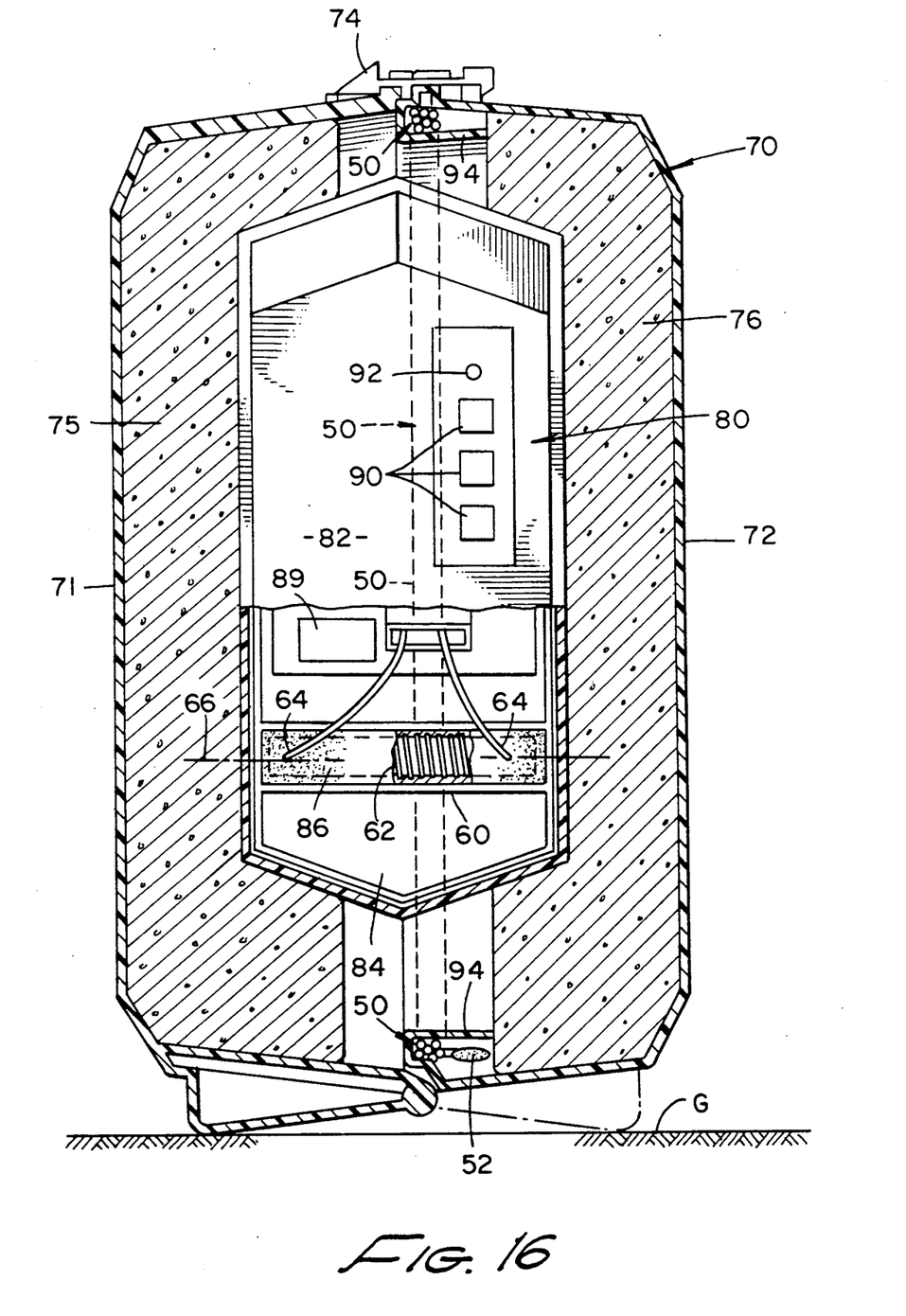
FIG. 16 is a cross-sectional view of the carrying case and its contents, taken on the line 16—16 of FIG. 15.
Figures 17, 19:
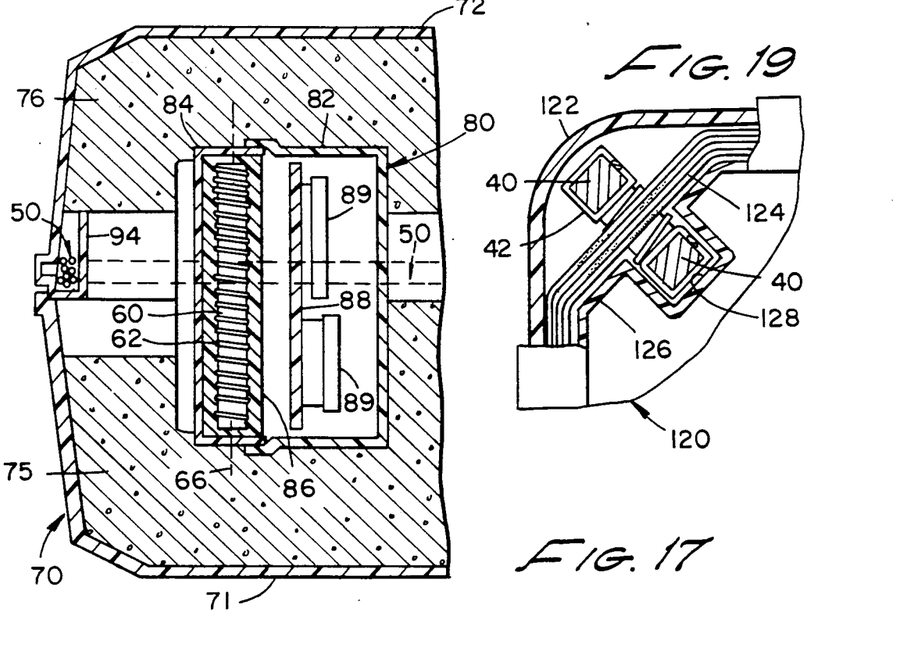
FIG. 17 is a cross-sectional view of the carrying case and the transmitter, taken on the line 17—17 of FIG. 15.
FIG. 19 is a fragmentary cross-sectional view of the seventh and preferred embodiment of the invention in which the carrying case is modified to accommodate a toroidal ferrite core antenna.
Figure 18:
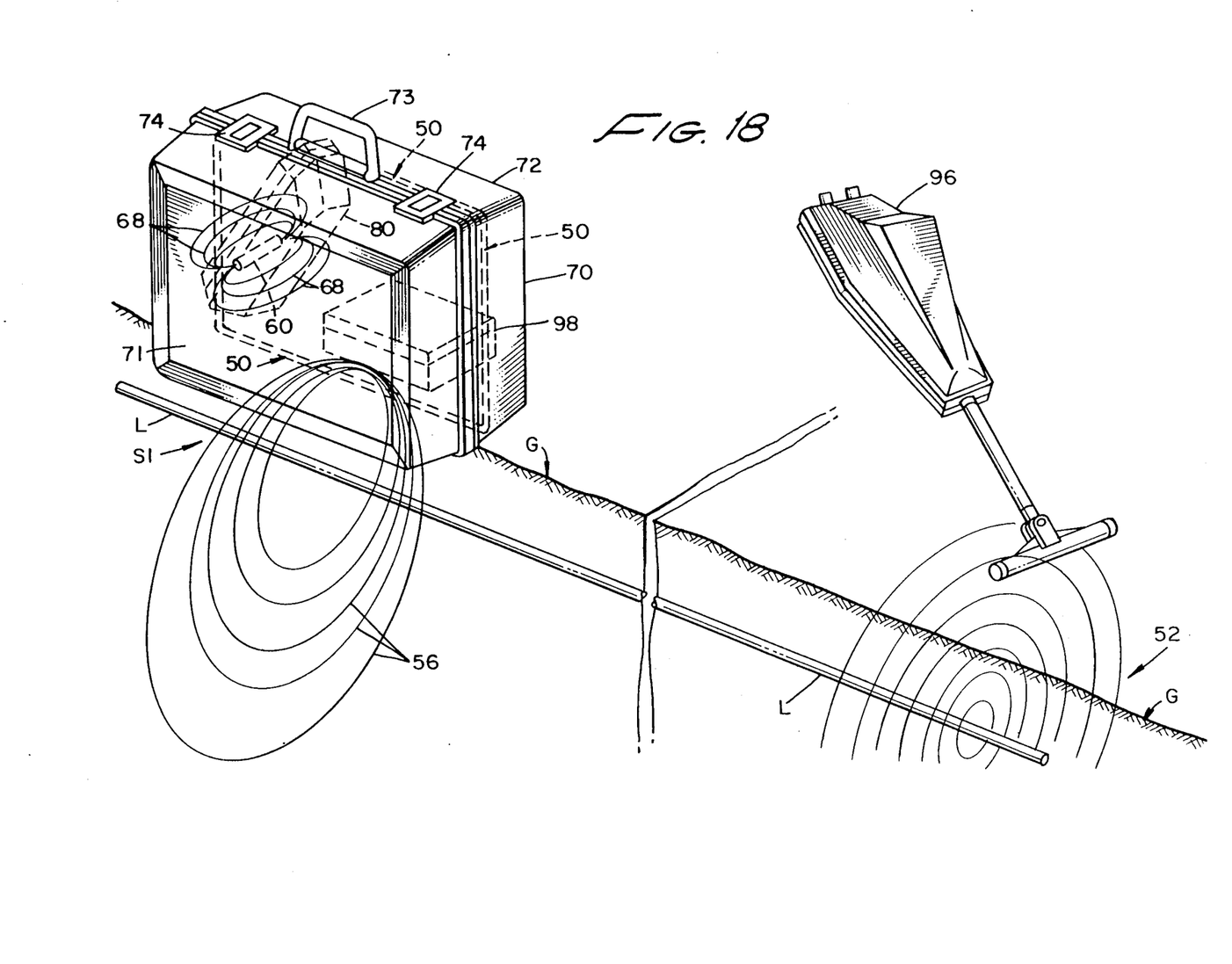
FIG. 18 is a perspective view of a complete system of apparatus in accordance with the second embodiment of the invention, showing its manner of operation.

According to the invention, a transmitter apparatus includes a portable housing or case 70, shown in FIGS. 14-18, which is adapted to be placed on the ground at the first work station. It contains a battery-powered transmitter circuit 89 having a predetermined operating frequency, as shown only in FIGS. 16 and 17. A tank circuit 50, 52 (FIGS. 4-7) includes a loop antenna 50 and a capacitor 52, and is tuned to that same operating frequency, or substantially so. A ferrite rod antenna 60, 62 is incorporated in the transmitter circuit and is electrically isolated from the tank circuit. In an operative position as shown in FIG. 18 the loop antenna and the ferrite rod antenna are supported relative to each other and to the ground so that the axis 58 of the loop is horizontal, or substantially so, the longitudinal axis 66 of the ferrite rod passes within the loop of the loop antenna, and a magnetic field 56 generated from the loop antenna alternates in planes substantially perpendicular to the longitudinal axis of the underground line L. See FIG. 18.

More specifically, air loop antenna 50 has a capacitor 52 connected across its otherwise free ends to provide a tuned tank circuit. A straight ferrite rod 60 has a winding 62 with ends 64 to which a signal is applied from transmitter circuit 89, shown in FIGS. 16 and 17. The ferrite rod 60 has a longitudinal axis 66, indicated in FIG. 8, and generates planes of magnetic flux lines 68 which extend out in all radial directions from the axis 66.

Figures 11, 12, 13, 14:
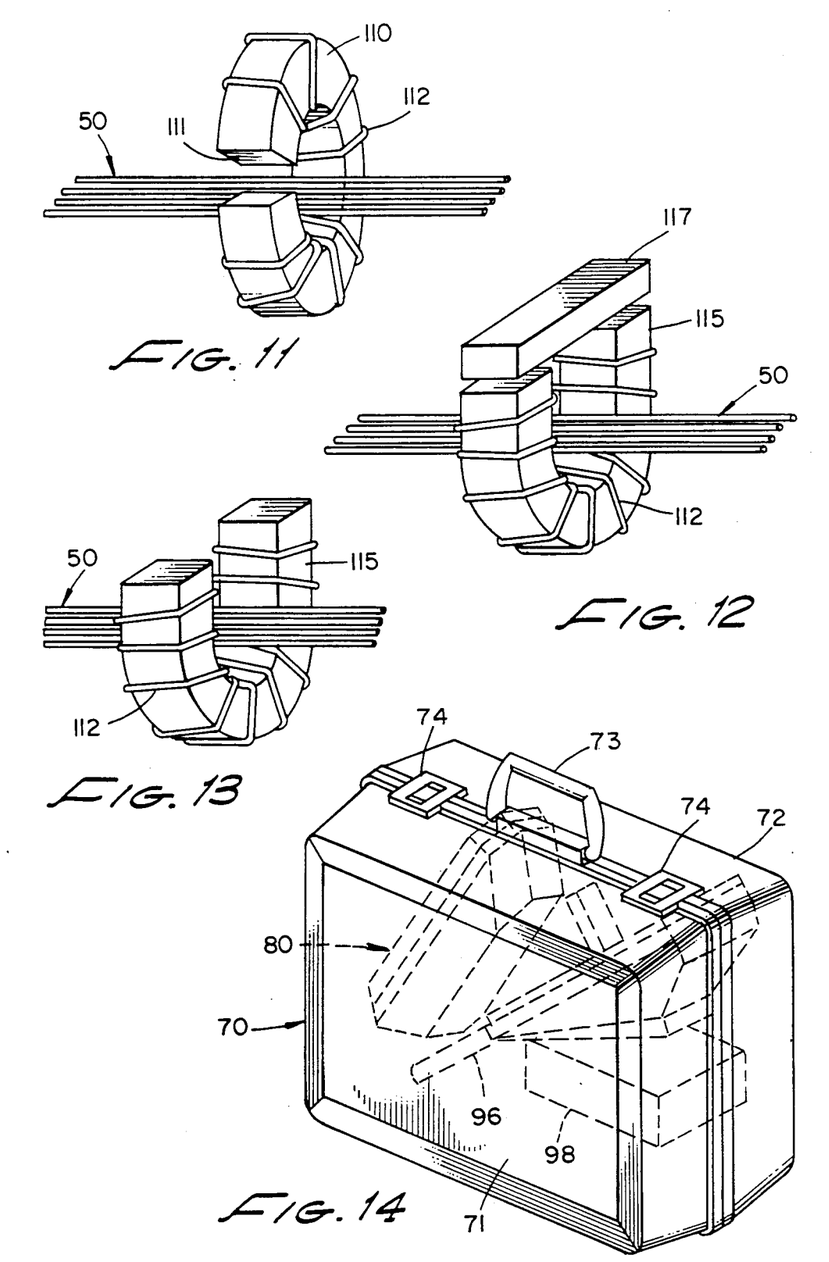
FIG. 11 is a perspective view of another ferrite core antenna in accordance with a fourth embodiment of the invention.
FIG. 12 is a perspective view of still another ferrite core antenna in accordance with a fifth embodiment of the invention.
FIG. 13 is a perspective view of a further modified ferrite core antenna in accordance with a sixth embodiment of the invention.
FIG. 14 is a perspective view of a carrying case in accordance with the second embodiment of the invention.

The case 70 is made of a non-conductive material, preferably thin-walled plastic, and is essentially in the shape of a suitcase, see FIG. 14. It includes a left side portion 71 and a right side portion 72 which are hinged together at the bottom. A handle 73 is attached to the upper and inner edge of the right side portion 72, and latches 74 are provided for latching the two sides of the case in a closed position. Much of the space in the interior of the case is filled with protective and insulative cushions made of a foamed plastic material, the left-hand cushion being designated 75 and the right-hand cushion as 76 (see FIG. 16).

A transmitter assembly 80 is removably retained in recesses in the protective cushions 75 and 76, and has a separate plastic housing in the form of a box-like top portion 82 and a lid-like bottom portion 84. As seen in FIG. 17, a filler member 86 occupies bottom portion 84 of the transmitter housing, and the ferrite rod 60 with its winding 62 is encased within that filler member. A printed circuit board 88 retained within the top portion 82 of the housing supports transmitter circuitry 89. Square buttons 90 shown in FIG. 16 provide controls for the transmitter circuitry, and an indicator light 92 indicates its operation state.

Figure 15:
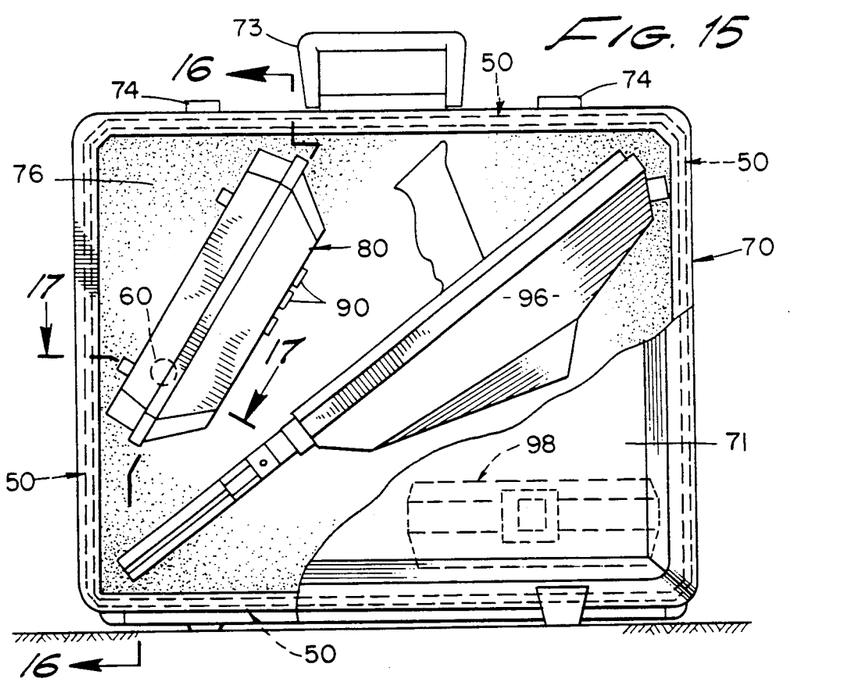
FIG. 15 is a side elevation view, partly cut away, of the carrying case of FIG. 14, also showing its interior contents.

A portable receiver 96 is removably carried within the case 70, as shown in dotted lines in FIG. 14 and as shown in solid lines in FIG. 15.

Shown in dotted lines in the lower right hand corner of the carrying case 70 in FIG. 15 is a utility box 98, which has no essential relation to the present invention, but may be used for carrying a workman's gloves or the like, if so desired.

The air loop antenna 50 is mounted within the periphery of the carrying case 70, as best seen in FIGS. 15, 16, 17, and 18. It is retained and protected by a plastic flange 94 which may be formed as an integral part of the case part 72, or alternatively, may be formed as a separate part and then secured to the case. As a result of this arrangement the air loop antenna assumes its proper posture when the carrying case 70 is placed on the ground in a normal position of rest, best shown in FIGS. 15, 16, and 18.

In operation, the significant difference between the present invention and the prior art system is that the present invention provides a much greater amount of input energy to the underground metallic line at the predetermined operating frequency. More effective impedance matching and coupling permit a greater amount of energy to be transferred from the tank circuit, including the air loop antenna, into the underground line. Further, the use of a magnetic core antenna permits using an air loop antenna of larger diameter than could otherwise be used, thus spreading more of the magnetic flux to pass underneath the underground line.

Figures 7, 8, 9, 10:
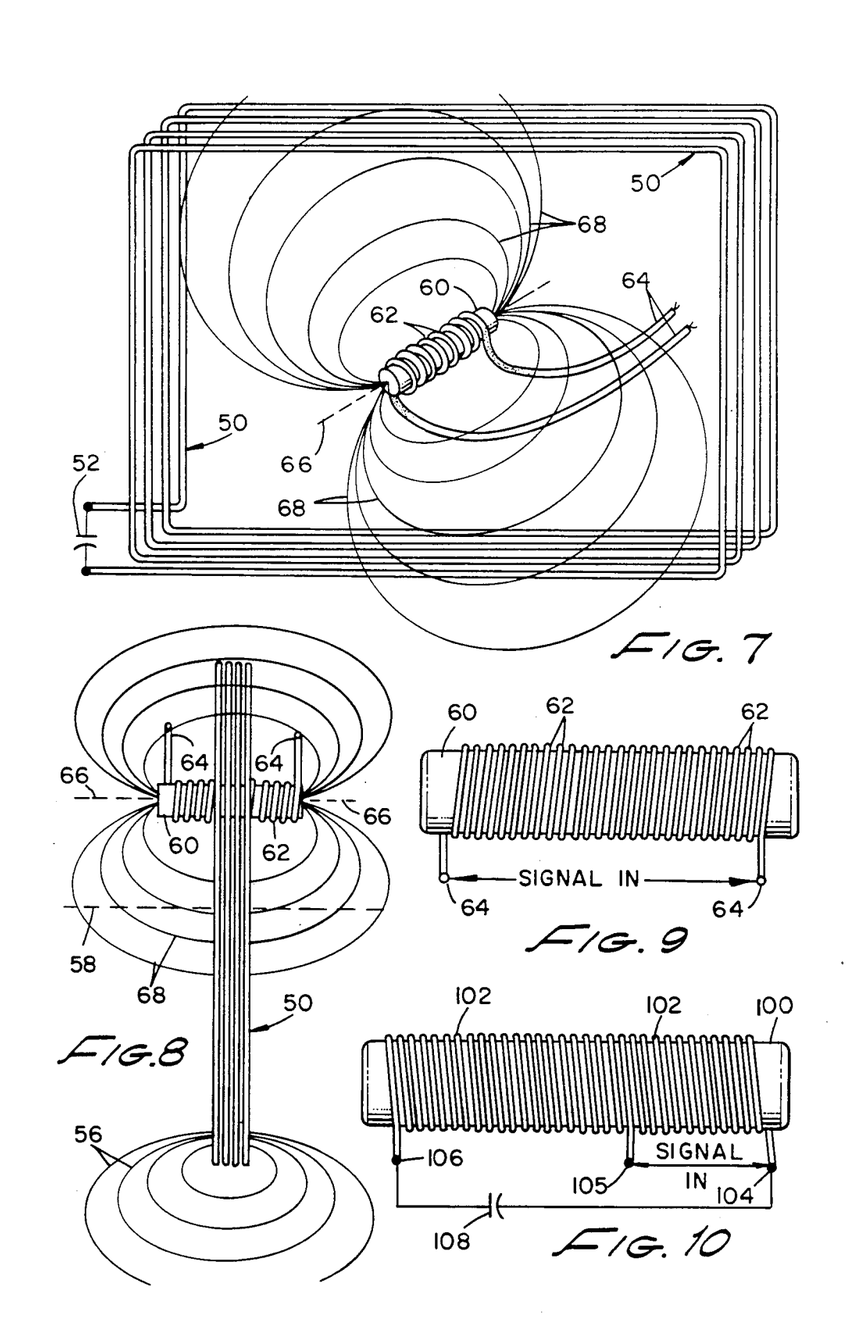
FIG. 7 is a perspective view of a loop antenna and a ferrite rod antenna in accordance with a second embodiment of the invention.
FIG. 8 is an end elevation view of the antenna apparatus of FIG. 7 in its operative position.
FIG. 9 is a detail view of the ferrite rod antenna of FIG. 8.
FIG. 10 is a detail view of a modified form of ferrite rod antenna in accordance with a third embodiment of the invention.

DESCRIPTION OF THIRD EMBODIMENT (FIG. 10)

FIG. 10 illustrates the third embodiment of the invention, which is the same as the preferred embodiment except for the specific design of the ferrite rod antenna and its associated circuitry.

Thus as shown in FIG. 10 a ferrite rod 100 has a winding 102 whose end points are represented by terminals 104 and 106. There is also a center tap terminal 105 brought out from the same winding. Terminals 104 and 105 are used as the input terminals, driven from the transmitter circuit 89. The circuit of the ferrite rod antenna is also tuned by means of a capacitor 108 which is connected across terminals 104 and 106, so that the device operates essentially as an auto-transformer with a tuned output circuit. In operation, the electrical and magnetic characteristics of the FIG. 10 embodiment provide some design choices which would perhaps not be available with the antenna system of FIGS. 7-9.

DESCRIPTION OF FOURTH EMBODIMENT (FIG. 11)

FIG. 11 illustrates the fourth embodiment of the invention, which is the same as the first and third embodiments except for the specific design of the ferrite core antenna.

Thus as shown in FIG. 11 a ferrite core 110 is in the form of a partial or incomplete toroid, having a circumferential gap 111 at one point on its circumference. It has a winding 112 whose end points, not specifically shown, are driven from the transmitter circuit 89. In operation, the electrical and magnetic characteristics of the FIG. 11 embodiment are somewhat different from either FIGS. 4-6 or FIG. 9.

DESCRIPTION OF FIFTH EMBODIMENT (FIG. 12)

FIG. 12 illustrates the fifth embodiment of the invention, which is the same as earlier embodiments except for the specific design of the ferrite core antenna.

Thus as shown in FIG. 12 a ferrite core 115 has the shape of a horsehoe, forming a partial or incomplete toroid, and also having an iron or ferrite bar 117 across its otherwise open ends. Winding 112 has end points driven from the transmitter circuit 89, not specifically shown. In operation, the electrical and magnetic characteristics of the FIG. 12 embodiment are somewhat different from previous embodiments.

DESCRIPTION OF SIXTH EMBODIMENT
(FIG. 13)

FIG. 13 illustrates the sixth embodiment of the invention, which is the same as the embodiment of FIG. 12 except for the omission of the bar 117. In operation, its electrical and magnetic characteristics are somewhat different from previous embodiments.

DESCRIPTION OF PREFERRED EMBODIMENT
(FIG. 19)

FIG. 19 illustrates the seventh and preferred embodiments of the invention. A modified carrying case 120 has an outer wall 122 with rounded corner area. Air loop antenna winding 124 is placed just inside the outer wall 122, except at the rounded corner. A plastic guard strip 126 is mounted inside the winding 124 to hold it in place. Just opposite the rounded corner of outer wall 122 there is a recessed portion 128 of the guard strip. The toroidal ferrite core antenna 40, previously shown in FIGS. 4-6, is then mounted about the winding 124. On the inner side of the winding it occupies the winding 124. On the inner side of the winding it occupies a space that is left between the winding and the rounded corner of the outer wall.

It will be apparent to those skilled in the art that other modifications, suggested by the present disclosure, may be made in accordance with the concept and spirit of the present invention.

The presently preferred embodiment of the invention has been described in considerable detail, and some alternate forms have been described in an outline form, in order to fully comply with the requirements of the patent laws. However, the scope of the invention is to be measured only in accordance with the appended claims.

What is claimed is:

1. In a system of apparatus for locating an underground metallic line, an improved transmitter apparatus for use at a first station above ground to inductively create an alternating current in the line and to thereby generate an alternating electromagnetic field about an extended length of the line, while a retriever at a second station above ground makes measurements within that alternating electromagnetic field which are determinative of both the horizontal location and the depth of the line at that station, said transmitter apparatus comprising:
   a portable transmitter circuit for providing an alternating current at a predetermined operating frequency;
   a tank circuit including a loop antenna and a capacitor tuned to substantially the same operating frequency as said transmitter circuit;
   a ferrite core antenna incorporated into said transmitter circuit and driven by said alternating current and electrically isolated from said tank circuit for producing magnetic flux coupled to said tank circuit; and
   means for supporting said loop antenna and said ferrite core antenna in such positions relative to each other and to the ground that the axis of the loop is substantially horizontal and also perpendicular to the direction of the underground metallic line, the longitudinal axis of said core extends within and through the loop of said loop antenna, and a magnetic field generated from said loop antenna by current induced therein by the magnetic flux produced by said ferrite core drives lines of flux substantially perpendicular to and underneath the underground line.

2. A transmitter apparatus as in claim 1 wherein said ferrite core is a rod the longitudinal axis of which passes through a central plane occupied by said loop antenna.

3. A transmitter apparatus as in claim 1 wherein said means for supporting said loop antenna and said ferrite core is a portable housing.

4. A transmitter apparatus as in claim 1 wherein said ferrite core is a toroid which encircles and encloses the winding of said loop antenna.

5. A transmitter apparatus as in claim 1 wherein said ferrite core is a partial toroid which partially encircles and encloses the winding of said loop antenna.

6. A transmitter apparatus as in claim 1 wherein said supporting means includes a housing made of non-conductive material, said transmitter circuit is fixedly mounted within said housing, said loop antenna is permanently secured within the periphery of said housing, and said ferrite core is fixedly supported from said housing in its desired positional relation to said loop antenna.

7. In a system of apparatus for locating an underground metallic line, an improved transmitter apparatus for use at a first station above ground to inductively create an alternating current in the line to thereby generate an alternating electromagnetic field about an extended length of the line, while a receiver at a second station above ground makes measurements within that alternating electromagnetic field that are determinative of both the horizontal location and the depth of the line at that station, said transmitter apparatus comprising:
   a portable housing adapted to be placed in a normal resting position on the ground at the first station;
   a battery-powered transmitter circuit fixedly supported from said housing, for providing an alternating current at a predetermined operating frequency;
   a loop antenna having an associated capacitor, thus providing a tank circuit tuned to substantially the same frequency, said loop antenna being fixedly supported from said housing such that in the normal resting position of said housing the axis of the loop is substantially horizontal;
   a ferrite core antenna incorporated into said transmitter circuit and driven by said alternating current, electrically isolated from said loop antenna for producing magnetic flux coupled to said loop antenna, and fixedly supported from said housing in such position that the axis of the core passes within and through the loop of said loop antenna; and
   said housing supporting said loop antenna and said ferrite core antenna in such positions relative to the ground that the axis of the loop is substantially horizontal and may also be perpendicular to the direction of the underground metallic line, and a magnetic field generated from said loop antenna by current induced therein by the magnetic flux produced by said ferrite core then alternates in planes substantially perpendicular to the longitudinal axis of the underground line.

8. A transmitter apparatus as in claim 7 wherein said ferrite core is a rod which passes through a plane occupied by said loop antenna.

9. A transmitter apparatus as in claim 7 wherein said ferrite core is a toroid which encircles and encloses the winding path of said loop antenna.

10. A transmitter apparatus as in claim 7 wherein said ferrite core is a partial toroid which partially encircles and encloses the winding path of said loop antenna.

11. A transmitter apparatus as in claim 7 wherein said housing is made of non-conductive material, said loop antenna is permanently secured within the periphery of said housing, and said ferrite core is fixedly supported from said housing in its desired positional relation to said loop antenna.

12. A system of apparatus for locating an underground metallic line, comprising:
   a carrying case made of a non-conductive material;
   a battery-powered transmitter circuit supported within said case, for providing an alternating current at a predetermined operating frequency;
   a loop antenna permanently secured within the periphery of said case;
   a capacitor connected to said loop antenna to provide a tank circuit tuned to said predetermined operating frequency;
   a ferrite core antenna incorporated into said transmitter circuit and driven by said alternating current, electrically isolated from said loop antenna and supported from said case in such position that the longitudinal axis of the core passes within the loop of said loop antenna for producing magnetic flux coupled to said tank circuit;
   said carrying case being adapted to removably receive a portable receiver; and
   said carrying case having a normal resting position on the ground above the underground line such that the axis of said loop antenna is substantially horizontal, whereby the axis of the loop may be aligned perpendicular to the direction of the underground metallic line so that a magnetic field may then be generated from said loop antenna by current induced therein by the magnetic flux produced by said ferrite core which alternates in planes substantially perpendicular to the longitudinal axis of the underground line.

13. A system of apparatus as in claim 12 wherein said ferrite core is a rod which passes through a plane occupied by said loop antenna.

14. A system of apparatus as in claim 12 wherein said ferrite core is a toroid which encircles and encloses one side of said loop antenna.

15. A system of apparatus as in claim 12 wherein said ferrite core is a partial toroid which partially encircles and encloses one side of said loop antenna.

16. A system of apparatus as in claim 12 which further includes a portable receiver removably carried within said case, whereby said case may be positioned at a first station above ground for inductively creating an alternating current in the line and hence an alternating electromagnetic field about an extended length of the line, and said receiver may be positioned at a second station above ground to make measurements determinative of both the horizontal location and the depth of the line at the station.

* * * * *